(12) United States Patent
Lenart et al.

(10) Patent No.: US 8,055,954 B2
(45) Date of Patent: Nov. 8, 2011

(54) STORAGE SYSTEMS AND METHODS FOR DISTRIBUTED SUPPORT TICKET PROCESSING

(75) Inventors: Alexandre Lenart, Los Altos, CA (US); Steven Maddocks, Windsor, CO (US); Richard Bickers, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 12/243,340

(22) Filed: Oct. 1, 2008

(65) Prior Publication Data
US 2010/0083059 A1   Apr. 1, 2010

(51) Int. Cl.
*G06F 11/00* (2006.01)
(52) U.S. Cl. ............... 714/48; 714/42; 714/6.1
(58) Field of Classification Search ............. 714/5, 8, 714/25, 42, 46, 6.1, 6.11, 6.2, 48
See application file for complete search history.

(56) References Cited

U.S. PATENT DOCUMENTS

| | | | |
|---|---|---|---|
| 2005/0081118 A1* | 4/2005 | Cheston et al. | 714/47 |
| 2007/0288800 A1* | 12/2007 | Chavez et al. | 714/39 |
| 2008/0126887 A1* | 5/2008 | Brodeur et al. | 714/57 |
| 2008/0162688 A1* | 7/2008 | Reumann et al. | 709/224 |
| 2008/0244331 A1* | 10/2008 | Grimes et al. | 714/48 |

\* cited by examiner

*Primary Examiner* — Scott Baderman
*Assistant Examiner* — Sarai Butler

(57) ABSTRACT

Storage systems and methods for distributed support ticket processing are disclosed. An exemplary method may include accessing at least one storage device in a storage system by an interface manager to retrieve raw support ticket data from the at least one storage device. The method may also include analyzing the raw support ticket data at the interface manager to generate a support ticket for the storage system. The method may also include decoding the support ticket to an intermediate format at a management station. The method may also include presenting the converted support ticket to a user at the management station.

20 Claims, 4 Drawing Sheets

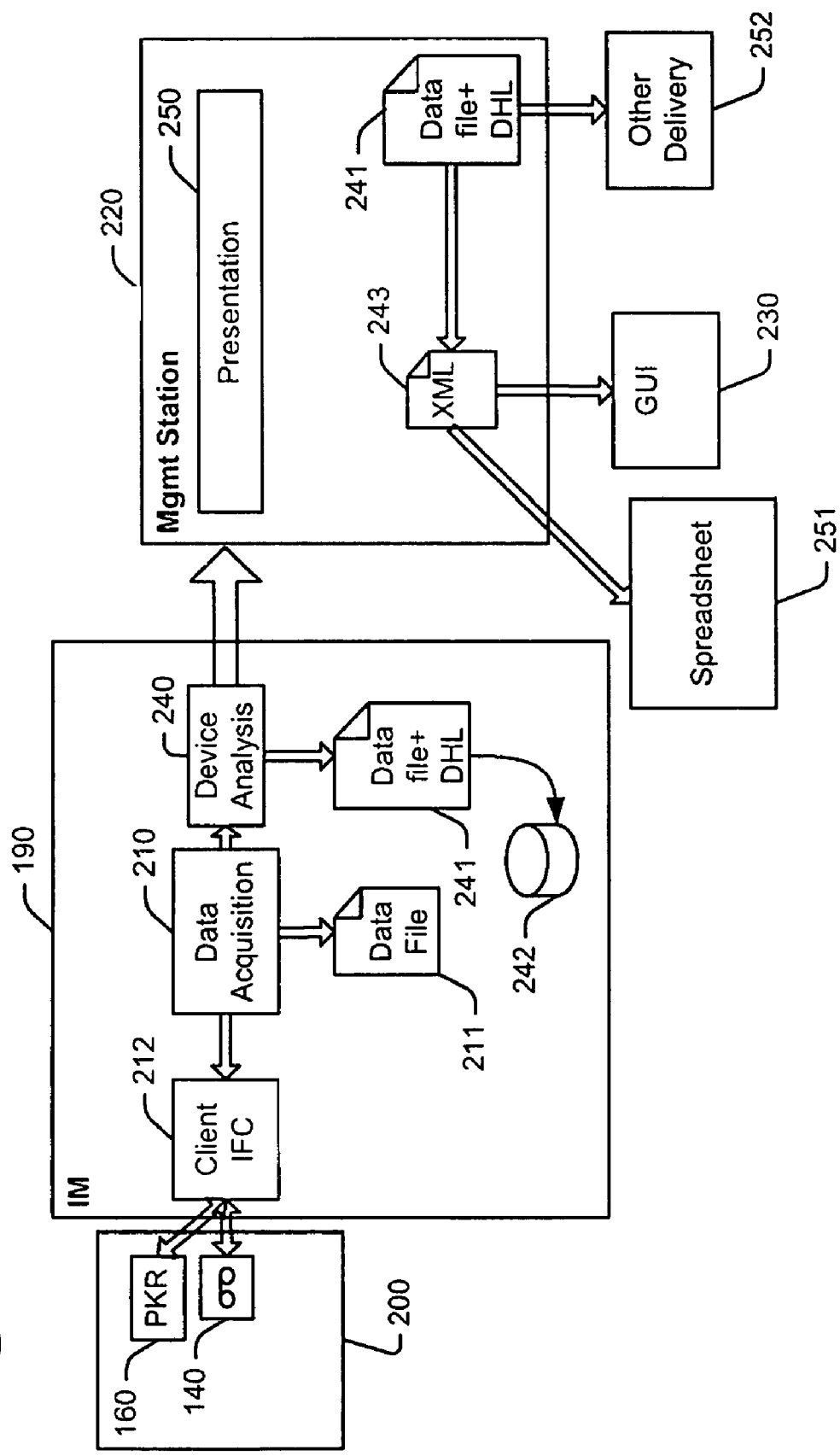

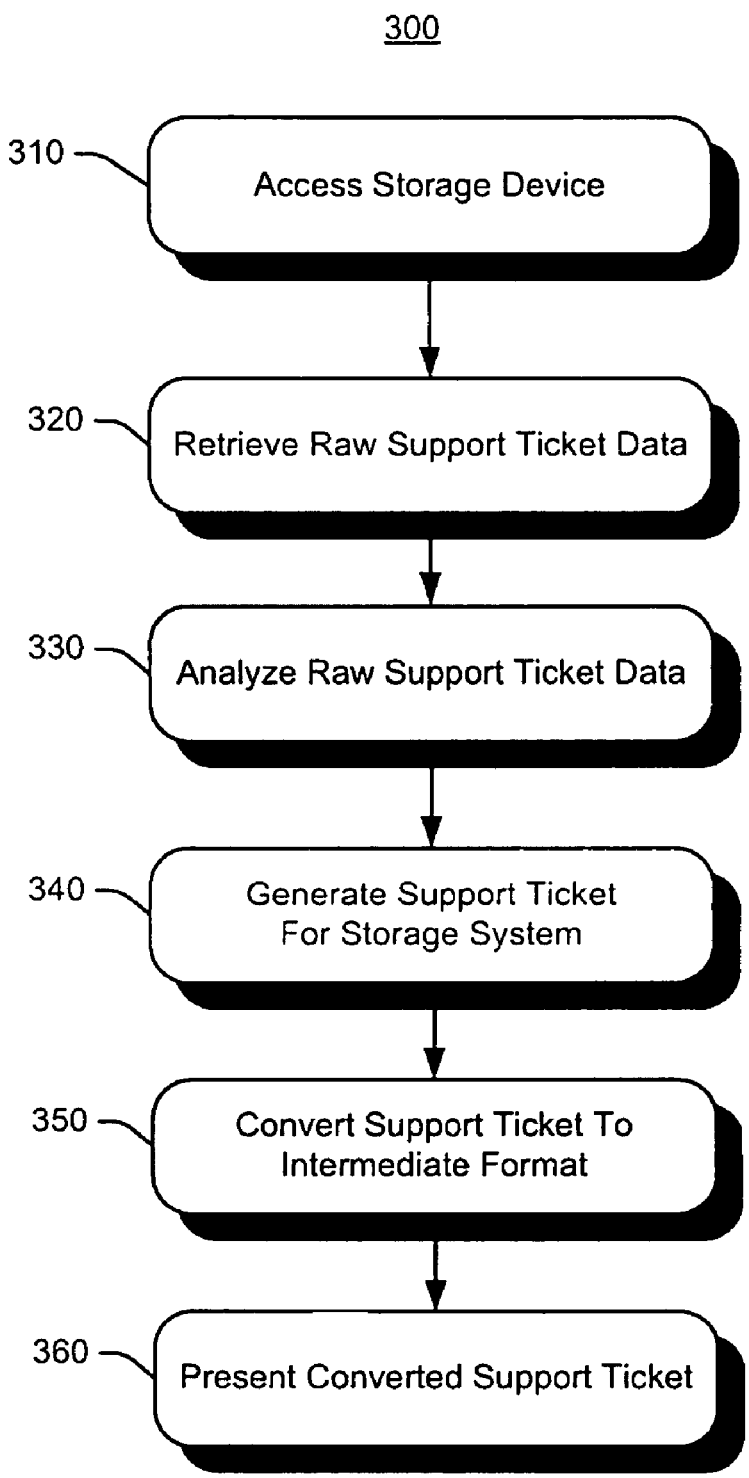

STORAGE SYSTEMS AND METHODS FOR DISTRIBUTED SUPPORT TICKET PROCESSING

BACKGROUND

Computer storage systems may be provided for handling large volumes of computer-readable data on removable storage media, such as magnetic tape cartridges and optical storage media, to name only a few examples (generally referred to herein as "storage cartridges"). Such storage systems may be provided as automated storage systems including one or more storage locations for a plurality of storage cartridges and a robotic picker assembly (or "picker") to handle the storage cartridges. One or more tape drives may be included for read/write operations on the storage cartridge. The picker and tape drives are generally be referred to as "storage devices."

Generating and archiving support tickets for troubleshooting storage systems, while conceptually simple, can prove challenging because of the large amount of data that needs to be collected, processed and presented to the user, which translates into crippling CPU bandwidth, physical memory, and persistent storage requirements.

Even when these factors don't prevent support ticket generation altogether, the time required for such operation can impact usability and device availability. Users who want to generate a support ticket for all of the storage system components have to sequentially generate tickets for each tape drive, interface controllers, the interface manager and the picker. Generating a tape drive support ticket can take up to ten minutes for a tape drive, sixty minutes for a library changer, thirty minutes for the interface manager, and a few minutes for each of the interface controllers (IFC). In a fully configured storage system, this process can take hours during which backup jobs are interrupted. This also increases the time a support team has to stay on-site to troubleshoot device issues.

There are other reporting strategies used for different types of storage devices ranging from network switches to storage arrays. However, tape libraries are architecturally and functionally different from these other device types, and reporting solutions is typically via in-band access that results in device down time as described above.

BRIEF DESCRIPTION OF THE DRAWINGS

FIGS. 2*a* and 2*b* are high-level schematic diagrams of the physical and logical architectures which may be implemented with the exemplary automated storage system shown in FIG. 1 for distributed support ticket processing.

FIG. 3 is a process flow diagram showing exemplary operations which may be implemented by an automated storage system for distributed support ticket processing.

DETAILED DESCRIPTION

Storage systems and methods for distributed support ticket processing are disclosed. Exemplary embodiments may decouple support ticket generation into multiple phases that are distributed between the interface manager (IM), management station (MS), and client application. Users can generate support tickets in much less time by off-loading resource intensive operations to a separate server, running support tickets for multiple devices in parallel, proactively generating and caching support tickets in advance for later use by the technical support team. If need be, the technical support team can also quickly generate support tickets on-site.

In addition, the described systems and methods use less disk space to store support tickets, enabling archiving on the IM itself. Archived data may be used for compound analysis (cross-device analysis potentially leading to an external root cause). For example, if more than one device fails when loading a particular storage media, the storage media may be causing the failure. Or for example, if the same device fails when loading different storage media, the device may have a problem. Archived data may also be used for device history analysis (analysis of multiple support tickets for a given device potentially leading to the root cause of a recurring issue). Recurring issues may be addressed by re-engineering a device, arrangement or layout, etc.

Customers can also access troubleshooting information without incurring the cost of library down time because support tickets can be generated and saved when the device is not in use. Presentation filters can then be applied based on the desired output format (e.g., customer format or technical support team format). Support tickets can also be graded for output to different levels of the technical support team. For example, intake members get basic information, repair technicians receive device specific information, and engineers receive historical and analytical information for making system changes. In any event, the relevant users are able to access troubleshooting data in a timely manner, thus reducing warranty cost. The systems and methods may also enable alerting based on advanced device analysis rules.

These and other advantages will be readily apparent to those having ordinary skill in the art after becoming familiar with the teachings herein. It will be readily appreciated that the systems and methods may result in better operation of the tape library and a better overall customer experience. The technical support team may also receive more useful troubleshooting data with a support claim when there is a problem.

Exemplary System

Figure 1:
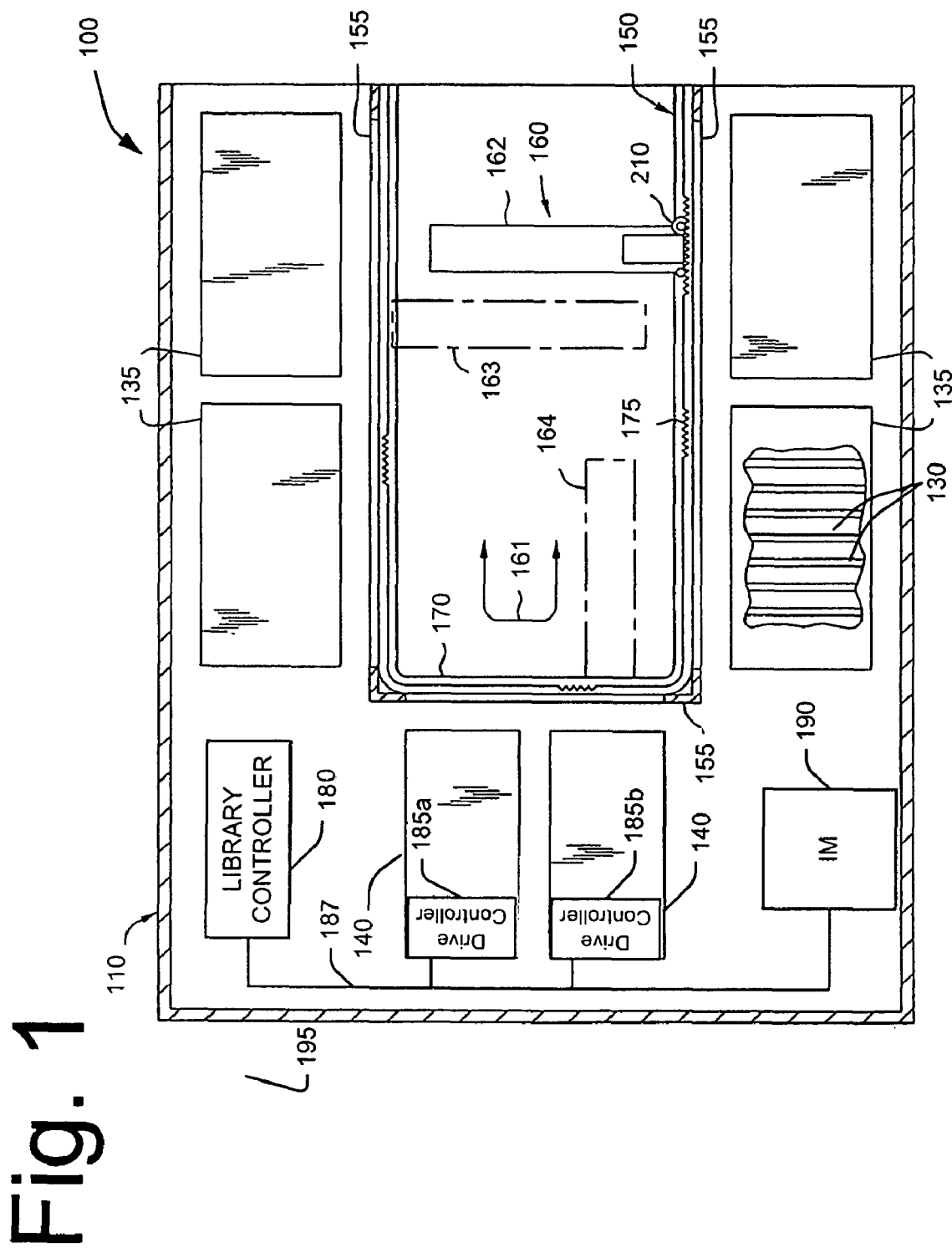
FIG. 1 is a top plan view of an exemplary automated storage system which may implement distributed support ticket processing.

FIG. 1 is a top plan view of an exemplary automated storage system which may implement distributed support ticket processing. Exemplary storage system 100 may include one or more libraries 110. The libraries 110 may be modular (e.g., configured to be stacked one on top of the other), allowing the storage system 100 to be readily expanded. The library 110 is configured to store computer readable data on one or more storage cartridge, such as tape media, although other magnetic data cartridges, optical media, and disk drives may also be used.

The storage cartridges may be provided in one or more storage locations 130. In an exemplary embodiment, the storage cartridges may be stored in one or more removable storage magazines 135, each having a plurality of storage locations. The storage locations may be arranged in the library 110 as shown in FIG. 1, although other arrangements are also possible.

One or more drive devices 140 may also be provided for read/write operations. In one exemplary embodiment, each library 110 is provided with at least one drive device 140. However, in other embodiments the drive devices 140 do not need to be included with each library module 110 in a storage system 100.

The storage system 100 may also include at least one robotic picker assembly, or picker 160. For example, the picker 160 is adapted to engage a storage cartridge, withdraw the storage cartridge (e.g., from one of the storage locations 130), transport the storage cartridge, and insert the storage cartridge into the drive device 140 for a read/write operation.

Picker 160 may be mounted to a guide system 150 in the storage system 100. In one implementation, the guide system 150 may be mounted in a translate frame 155 that moves the picker 160 between vertically stacked libraries 110. In any event, guide system 150 may define a horizontal displacement path (illustrated by arrows 161) adjacent the storage locations 130 and the data access device(s) 140.

For purposes of illustration, picker 160 is shown in FIG. 1 as it may be moved through displacement path 161 to positions 162, 163, and 164. The picker 160 is positioned adjacent the storage locations 130 at positions 162, and 163, and adjacent one of the drive devices 140 at position 164.

In an exemplary embodiment, the guide system 150 may comprise a railing 170 and a gear track 175. Picker 160 may be movably mounted to the railing 170. The picker 160 also includes gears (not shown) that cooperate with gear track 175 to move the picker 160 through displacement path 161 on the guide system 150.

It is noted that although the storage system 100 is shown in FIG. 1 according to a particular configuration, other suitable configurations are also contemplated as being within the scope of the invention. In addition, the number of libraries, and the number of storage locations and drive devices provided with each library, may depend upon various design considerations. Such considerations may include, but are not limited to, the frequency with which data is accessed. Still other considerations may include, by way of example, the physical dimensions of the library, the storage locations, and/or the drive devices.

Storage system 100 may also include a library controller 180 for implementing control operations in the library 110. An exemplary library controller 180 may include a processor (or processing units) and software and/or firmware provided in computer-readable storage (or memory), or other logic. The library controller 180 is operable to process computer-readable instructions (e.g., computer data signals embodied in one or more carrier waves). The computer-readable instructions may be received from a network computer, user interface provided as part of a storage system, or a system memory.

Library controller 180 may include program code to control movement of the picker 160. For example, library controller 180 may establish a communications link (e.g., via RF communication) with a picker controller (not shown) at the picker 160. Library controller 180 may then issue commands, e.g., to retrieve storage cartridges from the storage locations 130 in the automated storage system 100 and deliver the storage cartridges to the drive device 140. Library controller 180 may also include program code for maintaining system inventory.

Library controller 180 may be linked to one or more drive controllers 185a, 185b at the drive devices 140 (e.g., via the ADI 187). Library controller 180 may be implemented to issue commands to one or more drive controllers 185a, 185b via the ADI 187. Drive controllers 185a, 185b may also be provided with processing capability and program code to control operations at the drive devices 140 (e.g., load, eject, drive status, etc.) In response to instructions from the library controller 180 and/or an interface manager 190.

In an exemplary embodiment, interface manager 190 may be communicatively coupled to the library controller 180 (e.g., via TCP/IP connection 195). Interface manager 190 may control operations for the storage system 100 and provide an interface between the storage system 100 and client devices for manageability data transfer. The interface manager 190 may also invoke program code for distributed support ticket processing, as described in more detail below with reference to FIGS. 2a-b.

Figure 2A:
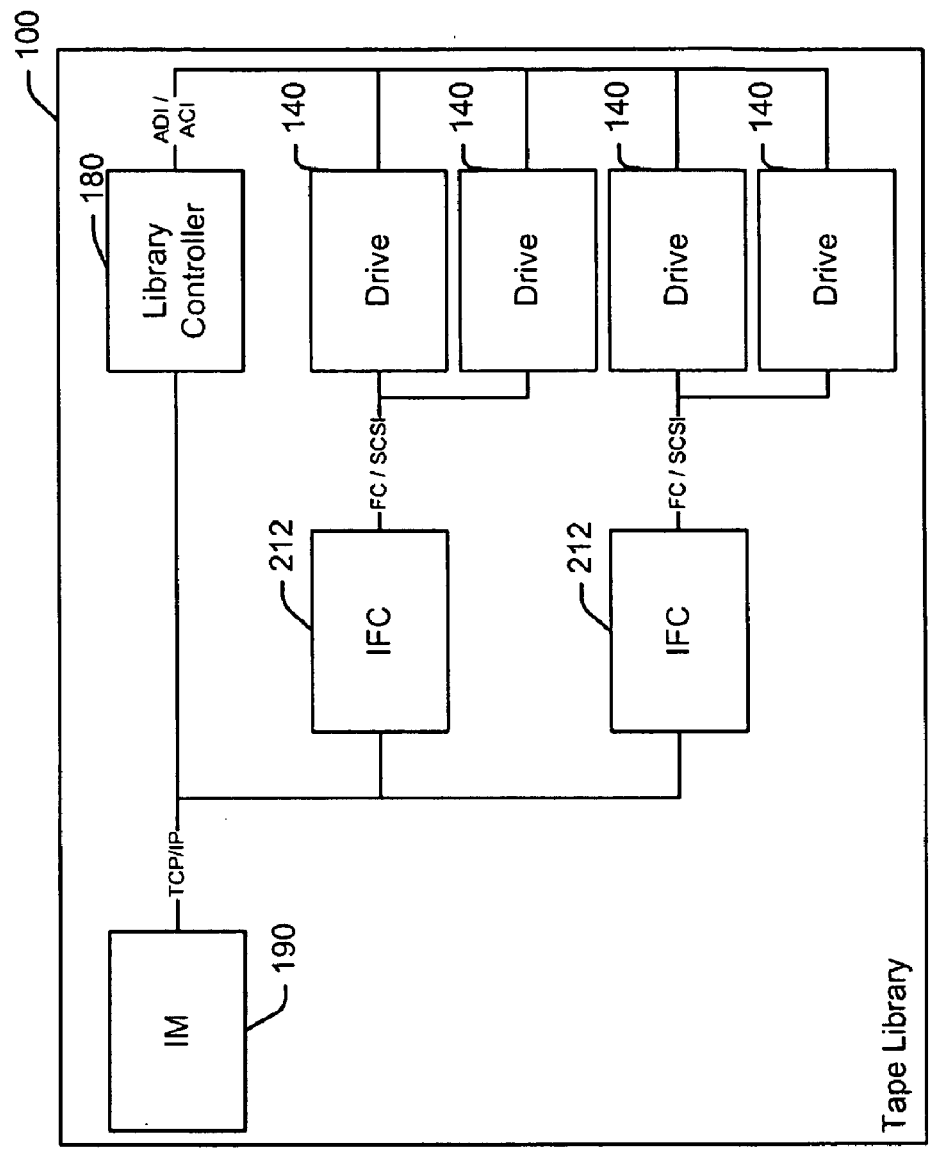

FIGS. 2a and 2b are high-level schematic diagrams of the physical and logical architectures which may be implemented with the exemplary automated storage system 100 shown in FIG. 1 for distributed support ticket processing. The Extended Tape Library Architecture (ETLA) shown in FIGS. 2a and 2b is a three-tier solution including the storage devices 200 (e.g., tape drive 140 and picker 160), an Interface Manager (IM) 190 allowing for out-of band access to the storage devices, and a Management Station (MS) 220 (e.g., a server computer that has out-of-band access to the IM 190 and is used to serve a user interface 230). Client computing devices (not shown) may also execute the user interface in a web browser with content being served by the MS 220. This architecture enables decoupling support ticket generation into three phases: data acquisition, device analysis, and presentation. A policy-based engine may also be implemented to generate and cache support tickets asynchronously, allowing users to quickly access up-to-date support tickets.

Data acquisition phase 210 is the first phase of support ticket generation. This phase includes accessing the storage device(s) 200 in-band (through the client interfaces 212) or out-of-band (e.g., via a private LAN). Data acquisition executes on the IM 190 and results in a "raw" support ticket 211 made up of binary logs and other troubleshooting information available on the storage devices 200. This support ticket 211 is small (e.g., less than about 500 KB) and may be stored on the IM 190.

In an exemplary embodiment, the data acquisition phase 210 may be executed in parallel for multiple storage devices 200. Parallelism yields significant time savings. As an illustration, tests show that it takes an average of 30 seconds to generate a support ticket for one tape drive 140, but only 40 seconds to generate a support ticket for two tape drives 140 and 120 seconds to generate a support ticket for eight tape drives 140.

Device analysis 240 is the second phase of support ticket generation. Device analysis 240 implements a rule-based engine that automatically finds the root-cause of the most common issues encountered for a given device type. The resulting support ticket 241 from device analysis 240 can be used to generate alerts and is also saved within the support ticket itself and can be later showed to the user. In exemplary embodiments, such as for LTO tape drives, the result of device analysis 240 may be saved in the device ROM 242 itself, e.g., as file 241. Device analysis 240 is typically executed by the IM 190. However, device analysis 240 may also be executed on a different tier of the architecture when device access is not needed.

Presentation 250 is the third phase of support ticket generation. Presentation 250 applies decoding rules to the support ticket and results into an intermediate format (e.g., XML report 243) more suitable for user viewing of the support ticket data. In an exemplary embodiment, the intermediate format is XML, which, coupled with XSL, can be readily presented to the user in any desired output format. Presentation 250 is the most CPU and memory demanding stage of support ticket generation, and is therefore executed on the MS 220. The result is viewable in the user interface 230. Presentation 250 is run "just-in-time" and doesn't have any impact on the device operational state. The intermediate format may be stored temporarily and may be used for viewing to reduce persistent storage requirements.

In exemplary embodiments, the XML report 243 may also be delivered to a spreadsheet, e.g., for manual compound analysis or other analysis. Likewise, the support ticket 241 may also be emailed or otherwise delivered 252 to a user for alerts or analysis.

In addition to generating support tickets when requested by the user, the system may also implement a policy engine that automatically generates and stores support tickets for storage devices 200 when the storage devices 200 are not in use. This is referred to herein as proactive support ticket generation, and applies mostly to tape drives, which are very unlikely to enter a failure mode when they are not backing up or restoring data.

Under the above assumption, a support ticket generated shortly after the drive was unloaded remains valid until a new tape is loaded in the drive. By tracking media unload events and subsequently generating support tickets for the corresponding devices at that time enables an up-to-date support ticket to already be available when requested by a user, and takes advantage of the device being unused to generate a support ticket to further optimize down time.

Before continuing, it should be understood that the exemplary embodiments discussed above are provided for purposes of illustration and are not intended to be limiting. Still other implementations are also contemplated.

Exemplary Operations

FIG. 3 is a process flow diagram showing exemplary operations 300 which may be implemented by an automated storage system for distributed support ticket processing. The operations may be embodied as logic instructions on one or more computer-readable media. The logic instructions may be executed on one or more processing units to implement the described operations. In all exemplary embodiment, the components and connections depicted in the figures may be used.

In operation 310 at least one storage device in the storage system is accessed by an interface manager. In operation 320, raw support ticket data is retrieved from the storage device(s). In an exemplary embodiment, the raw support ticket data may be retrieved when the storage device is not in use so that storage operations are not impacted. Also in an exemplary embodiment, the raw support ticket data may be retrieved in parallel from a plurality of storage device to speed the retrieval process.

In operation 330, the raw support ticket data is analyzed at the interface manager. In operation 340, a support ticket is generated for the storage system. The support ticket may include support information from one or more of the storage devices. In operation 350, the support ticket is converted to an intermediate format at a management station. And in operation 360, the converted support ticket is presented in a user application.

In an exemplary embodiment, the support ticket may be filtered to a desired output format. For example, the support ticket may be filtered for output in a format for a customer (e.g., giving a non-technical view). Or for example, the support ticket may be filtered for a technical support team (e.g., including more technical detail). In addition, the support ticket may be graded for output to different levels of a technical support team (e.g., initial intake, repair technician, and engineer). Grading may also be used for the customer (e.g., based on technical background or desire for technical detail).

In an exemplary embodiment, one or more support ticket may be archived. The archived support tickets may be used for cross-device analysis, e.g., to isolate a problem to a particular device or other cause (e.g., bad storage media). The archived support tickets may also be used for device history analysis. For example, a user may be alerted to a potential problem based on the device history analysis and application of various rules (e.g., device temperature exceeds temperature threshold for predetermined time indicating potential device malfunction). The user may be notified to replace a storage device, continue monitoring for a potential problem, etc.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A storage system comprising:
an interface manager provided internal to at least one storage device, the interface manager operable to retrieve raw support ticket data from the at least one storage device;
logic executable at the interface manager to analyze the raw support ticket data and generate a support ticket for the storage system;
program code executable by a management station provided external to the at least one storage device for converting the support ticket to an intermediate format for presentation to a user, thereby offloading resource intensive operations from the at least one storage device to a separate management station.

2. The storage system of claim 1 further comprising a user application for presenting the support ticket to a user.

3. The storage system of claim 1 wherein the program code executing at the management station filters the support ticket for output in the intermediate format as a non-technical customer format.

4. The storage system of claim 1 wherein the program code executing at the management station filters the support ticket for output in the intermediate format as a technically detailed format for a technical support team.

5. The storage system of claim 1 wherein the program code executing at the management station grades the support ticket for output in the intermediate format based on user desire for to different levels of technical detail.

6. The storage system of claim 1 wherein the support ticket is generated when the storage device is not in use.

7. The storage system of claim 1 further comprising using archived support tickets for cross-device analysis to isolate problems in the storage system.

8. The storage system of claim 1 further comprising using archived support tickets device history analysis to predict problems in the storage system.

9. The storage system of claim 1 further comprising alerting a user to a potential problem based on device history analysis.

10. A method for distributed support ticket processing, comprising: accessing at least one storage device in a storage system by an interface manager to retrieve raw support ticket data from the at least one storage device; analyzing the raw support ticket data at the interface manager to generate a support ticket for the storage system; converting the support ticket to an intermediate format at a management station external to the at least one storage device; and presenting the converted support ticket in a user application.

11. The method of claim 10 further comprising filtering the support ticket for output in a format for a customer.

12. The method of claim 10 further comprising filtering the support ticket for output in a format for a technical support team.

13. The method of claim 10 further comprising grading the support ticket for output to different levels of a technical support team.

14. The method of claim 10 wherein generating the support ticket when the at least one storage device is not in use.

15. The method of claim 10 further comprising retrieving raw support ticket data from a plurality of storage devices in parallel.

16. The method of claim 10 further comprising using archived support tickets for cross-device analysis.

17. The method of claim 10 further comprising using archived support tickets device history analysis.

18. The method of claim 17 further comprising alerting a user to a potential problem based on the device history analysis.

19. A system for distributed support ticket processing, comprising: means for analyzing raw support ticket data for at least one storage device at the interface manager; means for generating a support ticket for the storage system; means for converting the support ticket at a management station external to the at least one storage device for output in a preferred format.

20. The system of claim 19 further means for analyzing the support ticket.

* * * * *

UNITED STATES PATENT AND TRADEMARK OFFICE
CERTIFICATE OF CORRECTION

PATENT NO. : 8,055,954 B2
APPLICATION NO. : 12/243340
DATED : November 8, 2011
INVENTOR(S) : Alexandre Lenart et al.

It is certified that error appears in the above-identified patent and that said Letters Patent is hereby corrected as shown below:

In column 6, line 39, in Claim 5, before "different" delete "to".

Signed and Sealed this
Thirty-first Day of July, 2012

David J. Kappos
*Director of the United States Patent and Trademark Office*